United States Patent
Rowse et al.

(10) Patent No.: US 10,624,268 B2
(45) Date of Patent: Apr. 21, 2020

(54) MOUNTING CLIP FOR HAY RAKE TOOTH

(71) Applicant: ROWSE HYDRAULIC RAKES CO., INC., Burwell, NE (US)

(72) Inventors: Dannie Dean Rowse, Ord, NE (US); Rodney Dean Rowse, O'Neill, NE (US)

(73) Assignee: ROWSE HYDRAULIC RAKES CO., INC., Burwell, NE (US)

( * ) Notice: Subject to any disclaimer, the term of this patent is extended or adjusted under 35 U.S.C. 154(b) by 0 days.

(21) Appl. No.: 14/254,281

(22) Filed: Apr. 16, 2014

(65) Prior Publication Data

US 2014/0311117 A1  Oct. 23, 2014

Related U.S. Application Data

(60) Provisional application No. 61/812,813, filed on Apr. 17, 2013.

(51) Int. Cl.
*A01D 76/00* (2006.01)
*A01D 80/02* (2006.01)

(52) U.S. Cl.
CPC .................. *A01D 80/02* (2013.01)

(58) Field of Classification Search
CPC ........................................ A01D 80/02
USPC .................. 56/400, 377, 365, 366
See application file for complete search history.

(56) References Cited

U.S. PATENT DOCUMENTS

| | | | |
|---|---|---|---|
| 2,989,835 A * | 6/1961 | Johnston | 56/400 |
| 3,401,515 A | 9/1968 | Fishbaugh | |
| 3,664,107 A | 5/1972 | Keller | |
| 3,834,140 A | 9/1974 | Delfino | |
| D456,424 S | 4/2002 | Rowse et al. | |

\* cited by examiner

*Primary Examiner* — Thomas B Will
*Assistant Examiner* — Mai T Nguyen
(74) *Attorney, Agent, or Firm* — Zarley Law Firm, PLC

(57) ABSTRACT

A mounting clip includes an elongated channel having a first end, a central portion, and an elongated second section. Along the elongated section are at least two laterally widened sections that provide greater surface area for receiving an elastomeric block of a tooth. At least one of the ends of the channel extend beyond one of the laterally widened sections.

6 Claims, 6 Drawing Sheets

MOUNTING CLIP FOR HAY RAKE TOOTH

CROSS REFERENCE TO RELATED APPLICATION

This application claims the benefit of U.S. Provisional Application No. 61/812,813 filed Apr. 17, 2013.

BACKGROUND OF THE INVENTION

This invention relates to a mounting clip for a hay rake tooth and more particularly to an improved mounting clip that provides for more teeth and greater raking power.

Mounting clips are well-known in the art and include an elongated member with a center portion and two widened sections on each end. The central portion has legs or flanges that engage the sides of a wheel rim to prevent the clip from turning with respect to the rim of a wheel.

To provide sufficient strength to prevent turning during raking operations, conventional clips are 6.5 inches long. This length provides a spacing between teeth of 5.25 inches where a wheel having a diameter of 60.59 inches has 19 clips and 38 teeth. Under normal raking conditions, this design is acceptable. However, when used in short hay or shredded crops, an unacceptable amount of crop passes between the wider teeth and is left in the field. In heavy, wet crops, conventional rakes jump over the crop leaving hay because they lack sufficient raking power. Therefore a need exists in the art for a clip that addresses these deficiencies.

An objective of this invention is to provide a mounting clip that increases raking power.

A further objective of this invention is to provide a mounting clip that permits the mount of more teeth about a rim without reducing turning strength.

These and other objectives will be apparent to one of ordinary skill in the art based on the following written description, drawings and claims.

SUMMARY OF THE INVENTION

A mounting clip includes an elongated channel having a first end, a central portion, and an elongated second section. Along the elongated section are at least two laterally widened sections that provide greater surface area for receiving an elastomeric block of a tooth. At least one of the ends of the channel extend beyond one of the laterally widened sections.

DETAILED DESCRIPTION OF THE PREFERRED EMBODIMENT

Figure 1:
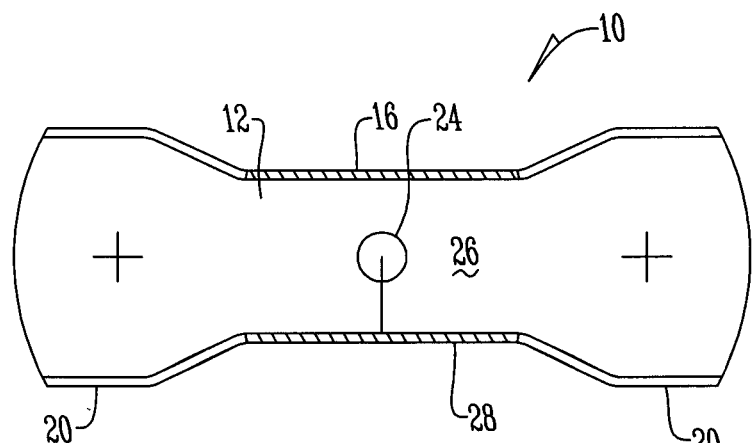
FIG. 1 is a bottom plan view of a prior art single mounting clip.
Figure 2:
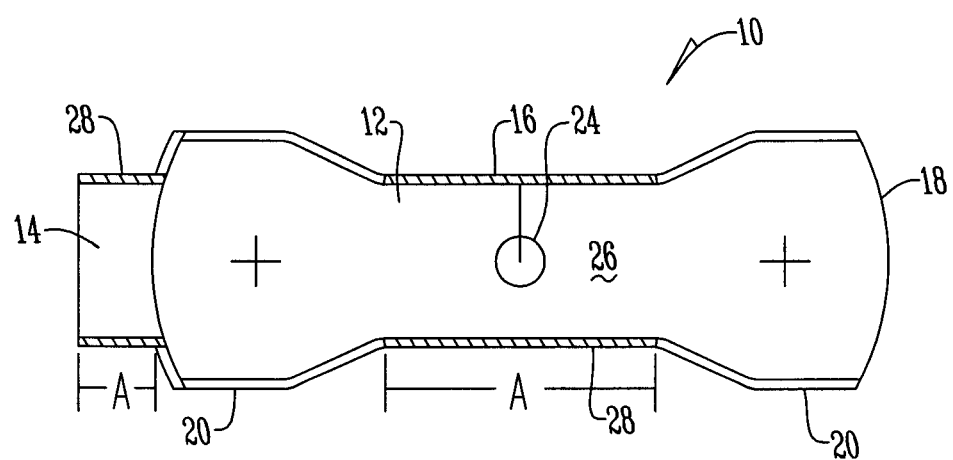
FIG. 2 is a bottom plan view of a mounting clip with more than one channel flange.
Figure 3:
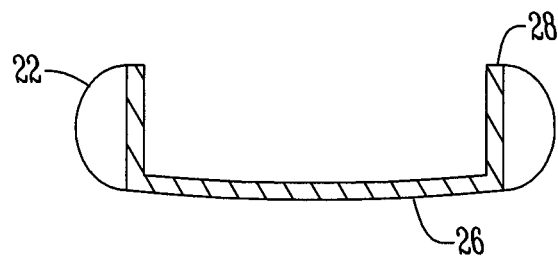
FIG. 3 is an end sectional view of a mounting clip.
Figure 4:
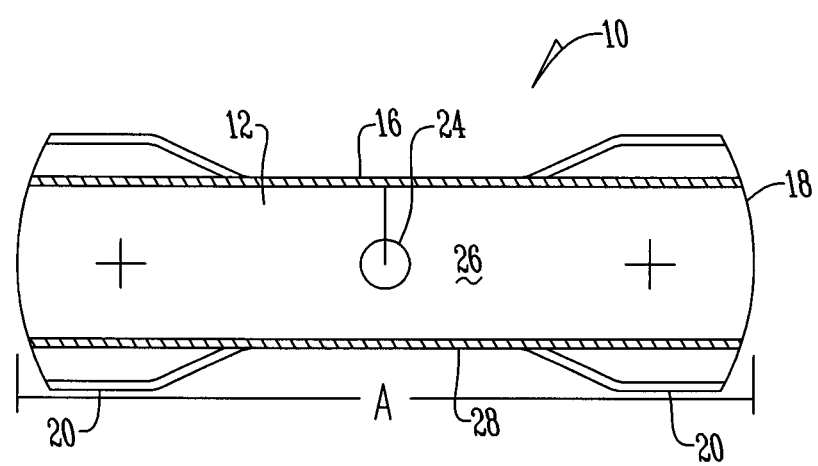
FIG. 4 is a bottom view of a single long channel flange.
Figure 5:
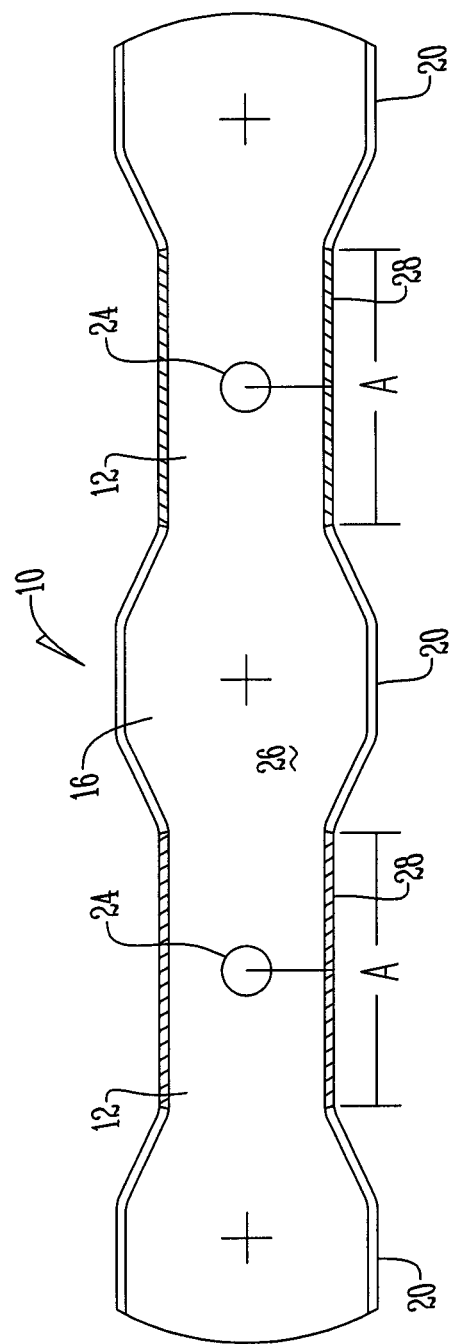
FIG. 5 is a bottom view of a mounting clip.
Figure 6:
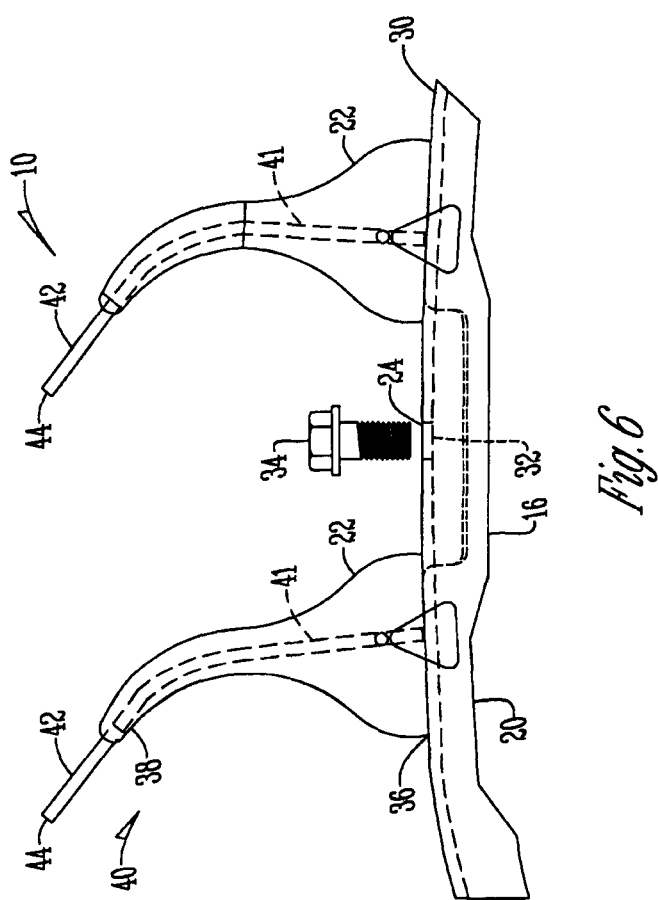
FIG. 6 is a side view of a tooth assembly
Figure 7:
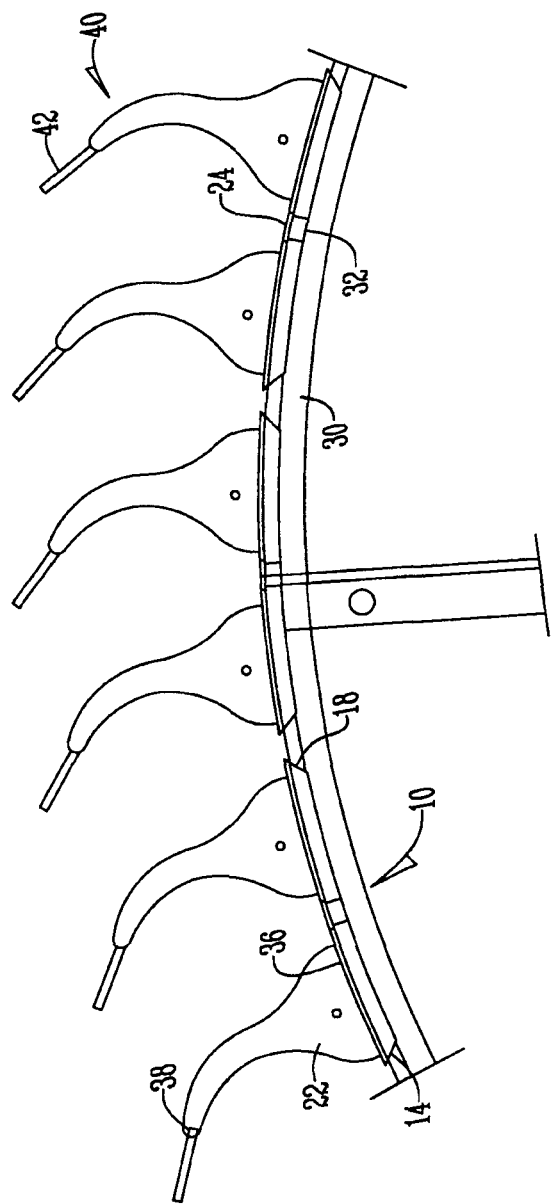
FIG. 7 is a side view of a plurality of teeth mounted to a hay rake wheel with a mounting clip.
Figure 8:
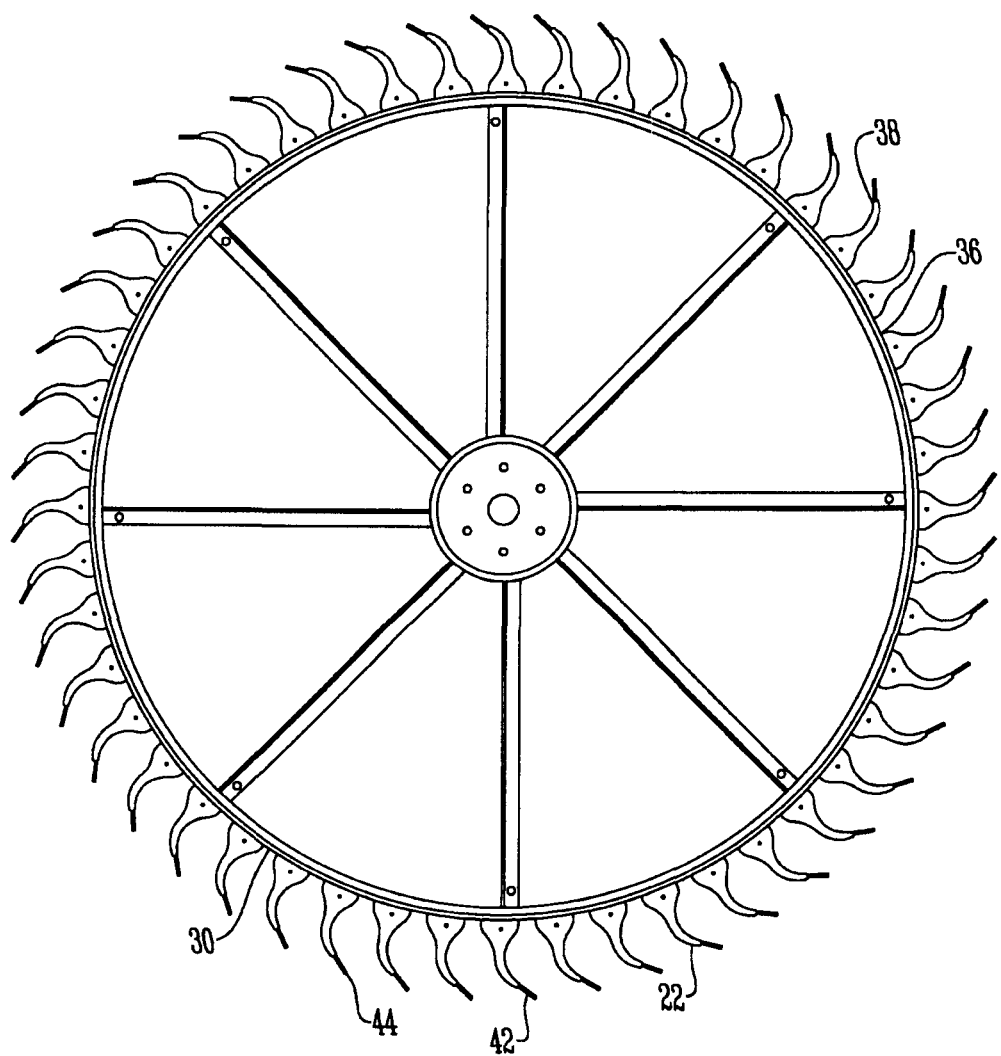
FIG. 8 is a side view of a raking wheel.

Referring to the Figures, a mounting clip 10 includes an elongated channel 12 having a first end 14, a central portion 16, and a second end 18. The clip 10 is laterally widened in two or more sections 20 to provide greater surface contact area with a radially inner end of an elastomeric block 22. The central portion 16 of clip 10 is positioned between the widened sections 20 and at least one of ends 14 and 18 extend beyond the widened sections 20. Preferably, the length of the clip 10 is 6.0 inches with one end 14 having a length of 0.5 inches. In one embodiment the central section 16 extends the full length of the clip 10. In an alternative embodiment the clip 10 has multiple central portions 16 separated by a third, centrally located, widened section 20.

The mounting clip 10 has an opening 24 in the base 26 of the clip 10 and legs or flanges 28 that extend radially inwardly from the base 26 and around the sides of a hay rake wheel rim 30 to maintain the clip 10 in alignment with the rim 30. The flanges 28 preferably are longer in the central portion 16 and at ends 14 and 18 to prevent the clip 10 from turning with respect to the rim 30. The rim 30 also has an opening 32 that aligns with opening 24 to receive a fastener 34 therethrough to connect the clip 10 with rim 30.

A plurality of teeth assemblies 40 are connected to the mounting clip 10. Each tooth assembly 40 includes a tine 42 molded to one of the blocks 22. Preferably block 22 is made of an elastomeric material such as rubber or the like. The block 22 is adhered to the radial outer surface of the clip 10 at a first end 36 and an enlarged portion extends for substantially the entire width. Preferably the block 22 is of a symmetrical cross-section and reduces in size at a second end 38 away from the clip 10. A terminal end 44 of tine 42 extends outwardly from the shank 41 beyond block 22.

In operation, a plurality of mounting clips 10 are connected around the exterior of the wheel rim 30 by fasteners 34 received through the openings 24 in the mounting clip 10 and the openings 32 in the wheel rim. The length of the mounting clip 10 allows for a greater number of mounting clips 10 to be positioned about the wheel rim 30, thereby increasing the number of teeth assemblies 40. During raking the additional teeth assemblies 40 provide greater raking power. The flanges 28 of the clips 10 avoid strength reduction by preventing the clips 10 from turning and maintaining alignment of the clips 10 on the rim 30.

Therefore, a mounting clip has been disclosed that at the very least meets all the stated objectives.

What is claimed:

1. A mounting clip, comprising:
an elongated channel that extends the length of the mounting clip and having a first end, a central portion, and a second end, wherein the elongated channel engages a wheel rim along the length of the elongated channel;
the elongated channel having a base and radially extending flanges, wherein the flanges are configured to extend opposing sides of the wheel rim;
at least two laterally widened sections along the elongated channel;
wherein at least one end of the elongated channel extends beyond one of the laterally widened sections;
a plurality of teeth assemblies having tines are secured to the mounting clip such that the tines extend radially outward around the circumference of the wheel rim and in the opposite direction of and in parallel-spaced alignment to the radially extending flanges.

2. The clip of claim 1 wherein there are three laterally widened sections along the elongated channel.

3. The clip of claim 1 wherein the first and the second end extend beyond the at least two laterally widened sections.

4. The clip of claim 1 wherein the elongated channel has a base with at least one opening and a pair of flanges that extend radially inwardly from the base.

5. The clip of claim 4 wherein the pair of flanges are longer at the first end, the second end, and the central portion.

6. The clip of claim 1 wherein the plurality of teeth assemblies include a tine molded to an elastomeric block that is adhered to the laterally widened section of the clip.

\* \* \* \* \*